United States Patent [19]
Hara

[11] Patent Number: 5,392,077
[45] Date of Patent: Feb. 21, 1995

[54] PROJECTION TV LIGHT CONTROLLER

[76] Inventor: Elmer H. Hara, 44 Cannington Mews, Regina, Saskatchewan, Canada, S4S 5Z7

[21] Appl. No.: 72,409

[22] Filed: Jun. 7, 1993

[30] Foreign Application Priority Data

Jun. 11, 1992 [CA] Canada .................... 2071055

[51] Int. Cl.⁶ .................... H04N 9/31; H04N 5/74
[52] U.S. Cl. .................... 348/750; 348/752; 348/757; 353/34
[58] Field of Search .................... 358/60, 56, 230, 231, 358/232, 236, 255; 359/49, 63-65, 247, 449; 353/31-34; 348/750, 745, 751, 752, 757, 762, 767; H04N 9/31, 5/74

[56] References Cited

U.S. PATENT DOCUMENTS

| | | | |
|---|---|---|---|
| 4,796,978 | 1/1989 | Tanaka et al. | 359/40 |
| 4,864,390 | 9/1989 | Mekechnie et al. | 353/34 |
| 4,936,658 | 1/1990 | Tanaka et al. | 359/40 |
| 4,995,702 | 2/1991 | Aruga | 359/40 |
| 5,073,013 | 12/1991 | Sonehara et al. | 359/63 |
| 5,153,752 | 10/1992 | Kurematsu et al. | 359/40 |

Primary Examiner—James J. Groody
Assistant Examiner—Glenton B. Burgess
Attorney, Agent, or Firm—Antonelli, Terry, Stout & Kraus

[57] ABSTRACT

A projection TV light controller is comprised of a plurality of blocks of material which are transparent to the light of a lamp, adjacent sides of the blocks being cooperatively shaped and being disposed adjacent to each other, to form a single light controlling element. The element is shaped to surround a cylindrical region coaxial with a central axis of the element for containing the lamp. Light is conducted from the lamp in each of the three primary colours into respective ones of the blocks. Apparatus is associated with each block for creating video display light signals relating to a corresponding primary colour. The video display light signals of all of the primary colours are combined into a single light beam which is conducted out of the light controlling element. With the lamp being contained in a central region, it can be cooled either by convection, by a fan, or by a fused quartz fluid jacket around the lamp, maintaining the block cool and minimally subject to expansion or contraction.

20 Claims, 5 Drawing Sheets

PROJECTION TV LIGHT CONTROLLER

FIELD OF THE INVENTION

This invention relates to projection TV display elements, and in particular to an active element which creates a picture to be projected.

BACKGROUND OF THE INVENTION

From the early days of projection TV, the picture projector was formed of three cathode ray tubes each displaying with high intensity in a single primary color phosphor, a picture for the respective colour received by the corresponding cathode ray tube. The three pictures were projected and aligned via an optical lens system. The resulting pictures were often poorly focused and the colours were often misaligned. Furthermore, after aging the misalignment became worse, requiring frequent servicing. Because of the requirement to use high intensity cathode ray tubes, which were driven close to their maximum tolerance, the lifetime of the cathode ray tubes was short. Therefore the operation of a projection TV was costly due to the requirement for replacement parts and due to the requirement for frequent servicing.

Other techniques have evolved to eliminate the requirement for use of high intensity cathode ray tubes. These generally utilize a light source such as a halogen or xenon lamp, filters to separate the various primary colours, and liquid crystals to form the pixel elements from each of the primary colours of light. Such systems are described for instance in U.S. Pat Nos. 4,936,658 issued Jun. 26, 1990, 4,861,142 issued Aug. 29, 1989 and 4,796,978 issued Jan. 10, 1989 to Seikosha Co., Ltd., U.S. Pat Nos. 5,073,013 issued Dec. 17, 1991, 4,904,061 issued Feb. 27, 1990 and 4,995,702 issued Feb. 26, 1991 to Seiko Epson Corporation.

The systems in these patents all suffer from one or more several problems. For example, the distance of travel of each colour of light to the final projection lens after being formed into a picture is different. This requires the use of spherical mirrors prior to the mirror combining system, resulting in fringing due to convergence problems.

These problems are compounded as the device heats during use and ages, or due to vibration during transportation causing minute movements of the elements forming the projection system.

In addition, the index of refraction for each of the couplers (filters) in each of the transmission elements within the projection structure is different for different colours, and even if they were not different, the refraction would vary because of the different distances the different coloured light beams are required to take. This also causes fringing, with deterioration in the resulting picture.

SUMMARY OF THE INVENTION

The present invention is a single solid structural element which is used to form a projection TV picture. It forms a single block which surrounds a central replaceable lamp. The nature of the block is such that the distance that each beam of coloured light for forming the picture must take is equal. The result is either no or minimal fringing in the resulting colour picture.

Because the picture forming element is a single block, and the light transmission paths are preferably not exposed to external air, there is either no or minimal deterioration caused by aging.

Due to the structure of the invention containing the lamp in a central region, it can be cooled either by convection, by a fan, or by a fused quartz fluid jacket around the lamp, maintaining the block cool and minimally subject to expansion or contraction. In the case of a fluid jacket, the fluid is made to flow to keep the structure cool. The fluid may be a suitable coolant such as water.

Polarizers can be used surrounding predetermined parts of the lamp in order to eliminate light at undesirable polarizations, thus minimizing fringing caused by different polarizations of light being reflected from liquid crystal video display control elements differently.

With the present invention preferably formed into a solid block using fused quartz parts, an anti-reflection coating can be applied to its outside surface, to keep transmission losses to a minimum.

The present invention can also be created in a form which provides 3D projection images based on light polarization set at right angles to create two light beams, with superior results to the prior art, for the reasons noted above. Because for the 3D embodiment of the invention both picture projection elements are within the same solid block, relative picture aging is minimized or eliminated, eliminating the requirement to align the pictures after transportation or aging of the device. Furthermore, local vibration during use will not cause relative movement between the picture creation elements, resulting in a superior 3D picture and illusion.

In case of a service problem, the entire picture creation element (projection light controller) can be removed and replaced as a single block, with no alignment required as between the three separate primary colour image beams.

It may be seen that the problems remaining in the prior art systems have been overcome by the present invention.

In accordance with the embodiment of the invention, a projection TV light controller is comprised of a plurality of blocks of material which are transparent to the light of a lamp, adjacent sides of the blocks being cooperatively shaped and being disposed adjacent to each other, to form a single light controlling element, the element being shaped to surround a cylindrical region coaxial with a central axis of the element for containing the lamp, apparatus for conducting light from the lamp in each of the three primary colours into respective ones of the blocks, apparatus in each respective block for creating video display light signals relating to a corresponding primary colour, apparatus for combining the video display light signals of all of the primary colours into a single light beam and for conducting the light beam out of the light controlling element.

Preferably each of the blocks is solid, and formed of fused quartz and cemented together, to form a single fused quartz rigid structure. In addition, preferably the apparatus for conducting light from the lamp is comprised of plural bandpass filters each one for passing a primary colour into a block, and located at the interface of the cylindrical region and a corresponding lock.

The apparatus for creating the video display light signals can be liquid crystal display (LCD) elements, Kerr cells, birefringent devices, or other electro-optic effect or light rotating polarizing elements.

There is no requirement for spherical lenses within the light controller and therefore refraction of different colours within the lenses resulting in fringing does not arise. Only a single achromatic projection lens is required.

BRIEF INTRODUCTION TO THE DRAWINGS

A better understanding of the invention will be obtained by reference to the detailed description below, in conjunction with the following drawings, in which:

FIG. 1 is a horizontal cross-section of a projection TV light controller in accordance with the present invention, FIG. 2 is a close up and detail of the central portion of the light controller, FIG. 2A is a graph of the transmission of light through a red bandpass filter, FIG. 2B is a graph of the transmission of light through a green bandpass filter, FIG. 2C is a graph of the transmission of light through a blue bandpass filter, FIG. 2D is a graph of the transmission characteristics of a red pass, green reflect, long pass filter, FIG. 2E is a graph of the transmission characteristics of a red pass, green pass, blue reflect and long pass filter, FIG. 3 is a cross-section of a back reflector of a flat liquid crystal video display unit, FIG. 4 is a horizontal cross-section of a second embodiment of the invention, FIG. 5 is a cross-section of a third embodiment of the invention as used to create a 3D image, FIG. 6 is an expanded cross-section with detail of the embodiment shown in FIG. 5, FIG. 6A is a graph of the transmission of the red pass, green reflect, blue reflect, long pass filter, FIG. 6B is a graph of the transmission characteristics of a red pass, green pass, blue reflect, long pass filter, FIG. 6C shows the transmission characteristics of a red pass, blue pass and green reflect filter, FIG. 6D is a graph of the transmission characteristics of a green bandpass filter, FIG. 6E is a graph of the transmission characteristics of a red bandpass filter, and FIG. 6F is a graph of the transmission characteristics of a blue bandpass filter.

DETAILED DESCRIPTION OF THE INVENTION

Figure 1:
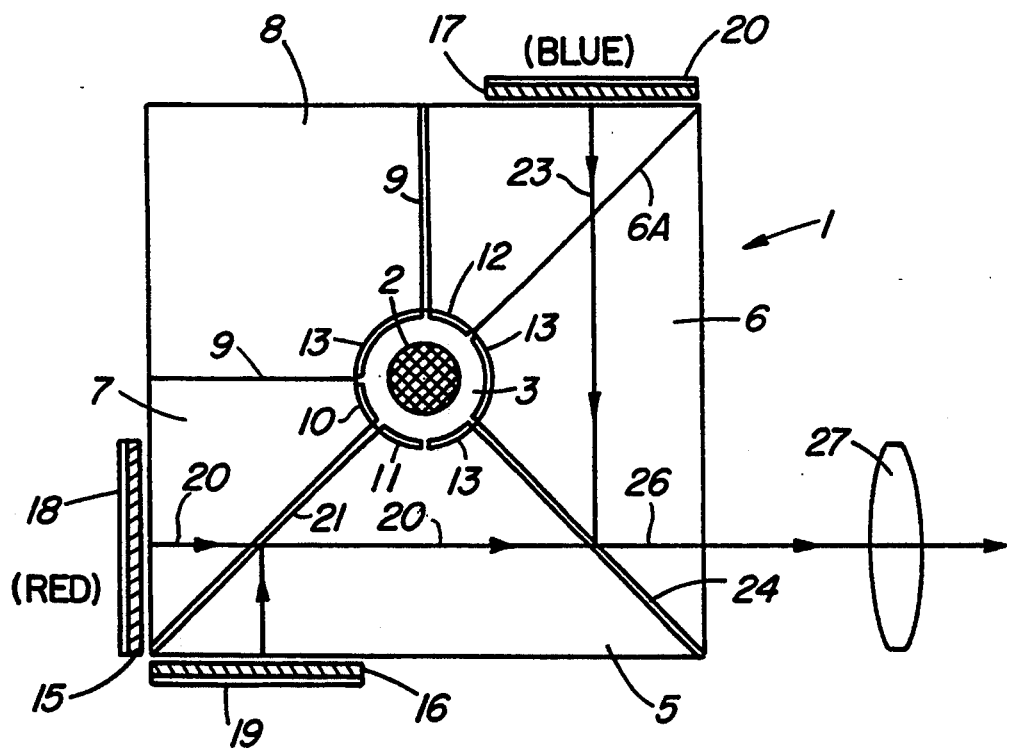

Turning to FIG. 1, an unitary projection TV light controller is formed of a plurality of blocks of material transparent to the light of a lamp 2 which are disposed adjacent each other as will be described below, to form a single light controlling element 1. The element is shaped to surround a cylindrical region 3 which is coaxial with a central axis of the element for containing the lamp. Preferably that axis is vertical in order to allow for convection movement of air surrounding the lamp within the cylindrical region 3 to rise. This may or may not be aided by a fan, not shown.

A first block 5 is generally triangularly shaped with 45° angles at its corners. Each of the sloping side surfaces is bounded by a light filter-reflector as will be described below.

A second block 6 has one side surface shaped to conform with the adjacent side surface of block 5, and, in the embodiment shown, has a second side surface, having a plane which, if extended, would be perpendicular to the external surface of block 5. However the second side surface of the block 6 need not be in that position and may for example have its plane at 180° to the first side surface. Note that for ease of manufacturing, block 6 can be made in two parts, for example joined at plane 6A.

A third block 7 has one side surface adjacent and conforming to the second side surface of block 5. The second side surface of block 7 can be located as shown, perpendicular to the outside surface of block 7 or can abut the adjacent second side surface of block 6. In the embodiment shown in FIG. 1, however, an additional, fourth block 8 is used which is redundant to the transmission of light, but with blocks 6 and 7 shaped as shown, block 8 fills out the preferred shape of the light controlling element.

Figure 2:
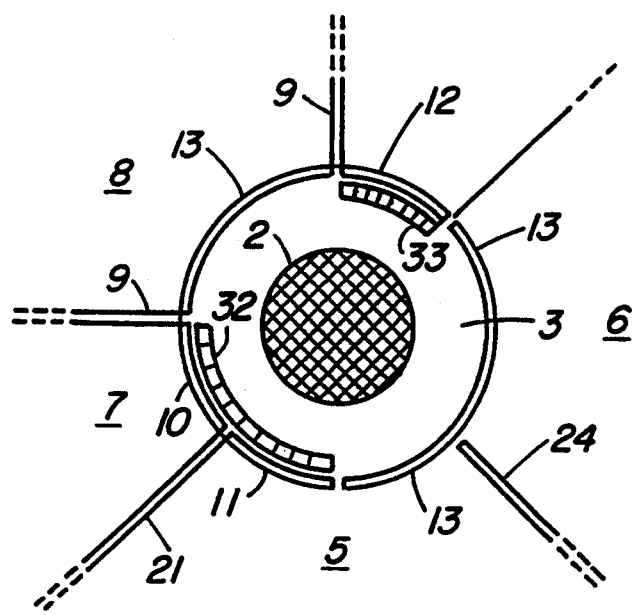

In this embodiment, it is preferred that the external cross-section of the light controlling element should be square. Each of the blocks is formed as will be described, and cemented together to form a single rigid structure. With reference in addition to FIG. 2, light absorbers 9 cover the surface of blocks 6 and 7 at the interfaces of those blocks and block 8. In case blocks 6 and 7 are formed to interface each other and block 8 deleted, a single light absorber is used. Any suitable light absorber can be used.

Figure 2A:
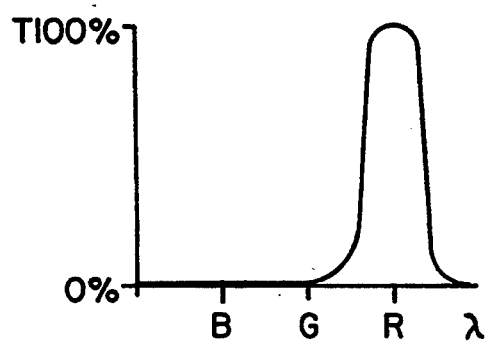
Figure 2B:
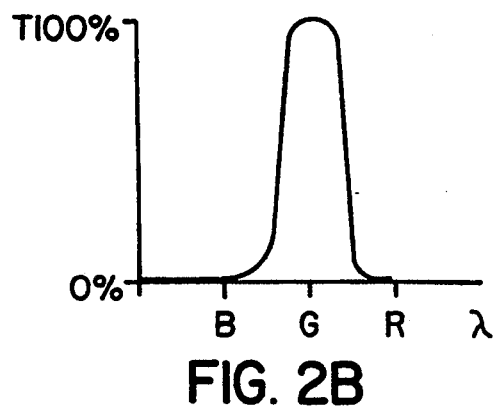
Figure 2C:
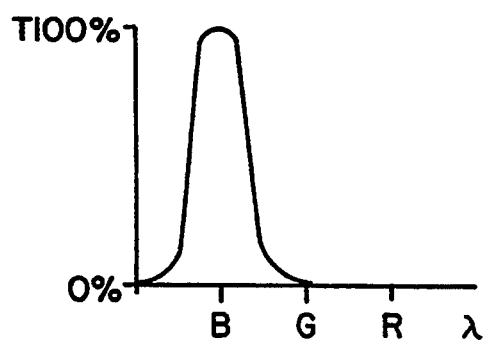

Lining the cylindrical region 3 over the periphery which abuts block 7 is a red bandpass filter 10, as shown in FIG. 2. FIG. 2A is a graph illustrating the transmission characteristics of the filter with respect to increasing wavelength. Thus it will be seen that light from lamp 2 will pass through the red bandpass filter into block 7, and light of other wavelengths will be reflected. A green bandpass filter 11 which surrounds cylindrical region 3 for approximately one-half the interface region between block 5 and cylindrical region 3 (the half which is closest to block 7) allows green light from the light 2 to enter block 5. FIG. 2B is a graph showing the transmission characteristics of that filter.

A blue bandpass filter 12 covers the interior of block 6 over the interior region which subtends an angle between surface 9 and a line between the axis of the cylindrical region and the exterior corner of block 6, which in the embodiment shown in FIG. 1, is 45°. Thus only light from lamp 2 which is in the blue wavelength region will enter block 6, from lamp 2.

The remainder of the blocks within the cylindrical region are covered by a reflector 13, for reflecting light from the light, thereby increasing the intensity of the light passing through the aforenoted filters.

Outside of the fused blocks image producing elements based on polarization rotation such as liquid crystal display units are disposed, facing and preferably in contact with the outside faces as follows.

Display unit 15 is located with one edge adjacent the interface between blocks 5 and 7 for creating a red primary colour image of the picture to be displayed. Display unit 16 is placed against the outside surface of block 5 with one edge adjacent the interface between blocks 5 and 7 for creating a green primary colour image of the picture. Display unit 17 is disposed against the outside surface of block 6 with one edge adjacent the outside corner of the block 6, the plain surface of display unit 17 facing the surfaces joining blocks 5 and 6.

Figure 2D:
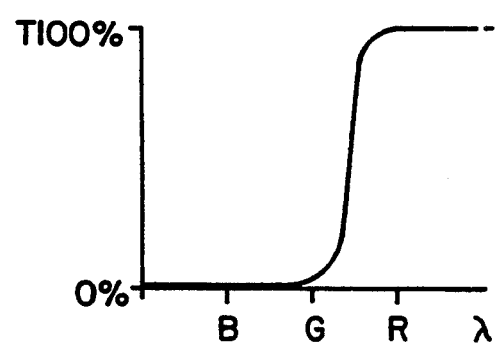

With only red light from lamp 2 entering block 7 and display element 15 (backed by a reflector 18) controlling reflection of the light in accordance with the pixel elements of the red portion of the image, reflected light beam 20 is created. A filter 21 which is red-pass and green-reflect as shown in the graph of FIG. 2D is sandwiched between the adjacent surface of blocks 5 and 7. This allows light beam 20 to pass straight through filter 21 into block 5. Yet it does not allow green light from block 5 to enter block 7.

In a similar manner, light from lamp 2 is reflected from liquid crystal video display unit 16 (which is backed by reflector 19). With display unit 16 reflecting the light in accordance with the pixels of the green primary colour portion of the eventual picture, that light is reflected directly from filter 21 along the same path 20 as the red primary colour image from display element 15, and it will be noted, the distance travelled by both coloured images is identical.

Light from lamp 2 is reflected from display unit 17, which is backed by reflector 20, and this creates a blue primary colour portion of the image. The resulting blue image light beam 23 passes to the interface of blocks 5 and 6 as shown.

Figure 2E:
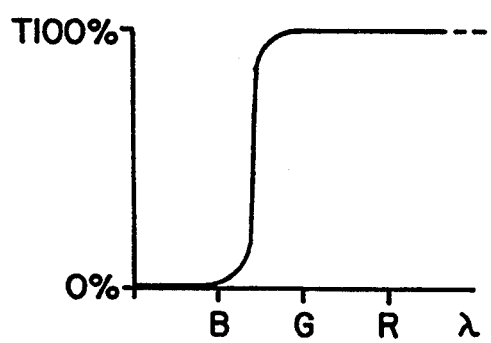

Sandwiched between blocks 5 and 6 at their interface is a filter 24, which is a red pass, green pass, and blue reflect optical filter 24, having transmission characteristics as shown in FIG. 2E. Accordingly beam 20 containing both the red and green picture elements pass through filter 24, while the blue elements of the picture contained in beam 23 are reflected by filter 24 directly along the same path as beam 20, to form a combined three colour beam 26. That beam, which is perpendicular to the outside surface of block 6, passes directly out of the block for focusing by the projection lens system 27 of which only one representative element is shown. It may be seen by a consideration of the geometry, that the distance travelled by the blue beam is identical to that of the red beam and of the green beam.

Figure 3:
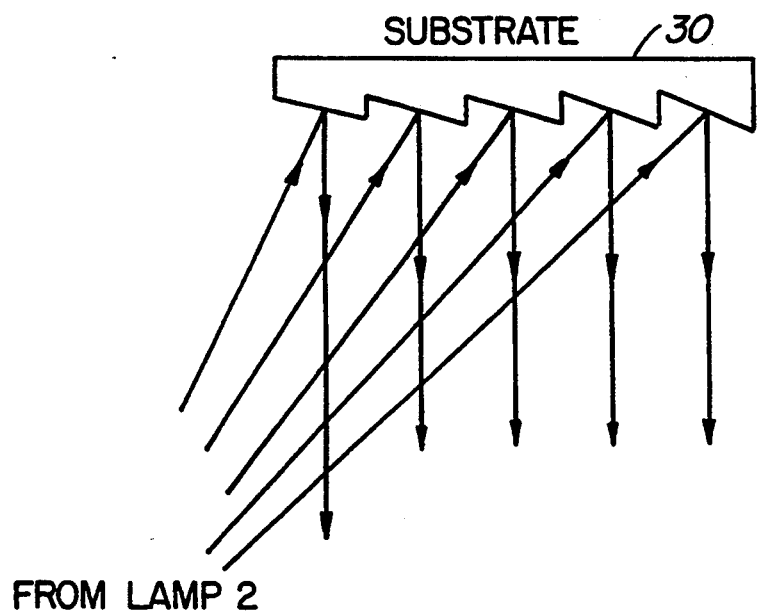

It may also be seen that the light from lamp 2 passes into the liquid crystal display unit at an angle to the front surface. FIG. 3 illustrates a cross-section of the reflector backing each of the liquid crystal display units which reflector 30 contains a saw-toothed front reflective surface the angled portions of which are angled so that the reflected light will pass through the liquid crystal video display units from the rear perpendicular to their front surfaces. The tilted angles of the surfaces of the saw-toothed reflectors 30 are such that the effects of the liquid crystal display units are accounted for.

Returning now to FIG. 2, within the cylindrical region 3 immediately adjacent filters 10, 11 and 12, vertical polarizers 32 and 33 are located. These restrict the light from lamp 2 to one polarization mode, causing the three primary colour images reflected by the display units 15, 16 and 17 to only contain one polarization mode of light, reducing or eliminating the fringing problem described in some of the prior art patents. The LCD units themselves have polarizers in front, which are to be oriented "vertically" aligned with polarizers 32, 33.

The polarizes 32 and 33 could alternatively be located between the filters 10, 11 and 12 and the image producing elements.

Figure 4:
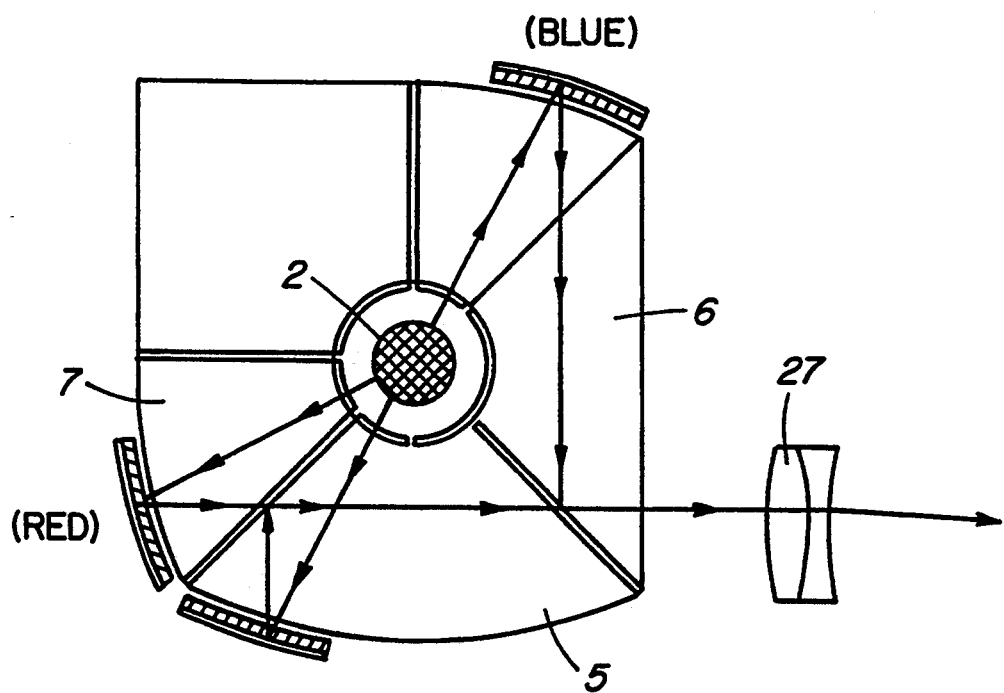

FIG. 4 illustrates a cross-section of another embodiment of the invention. The elements of FIG. 4 are labelled similarly to those of FIG. 1. However in this case the outside surfaces of blocks 5 and 7 are curved, as is the outside surface of the block 6 which is remote from the interface of blocks 5 and 6. The curvatures of the outside surfaces of the blocks are established so that the light from the lamp 2 is reflected directly into the projection lens system, e.g. in a parabolic shape. The image in this embodiment is linear in the vertical direction and curved in the horizontal direction. Therefore the lens system 27 will necessarily have elements of cylindrical and aspherical surfaces.

In this embodiment the display units are curved to match the curvature of the outside walls of the adjacent blocks. The curvatures are established so that the angle of incidence of the light from the lamp equals the angle of reflection with respect to a plane which is perpendicular to a line on the front surface of each display unit which is perpendicular to a tangent on that line.

Figure 5:
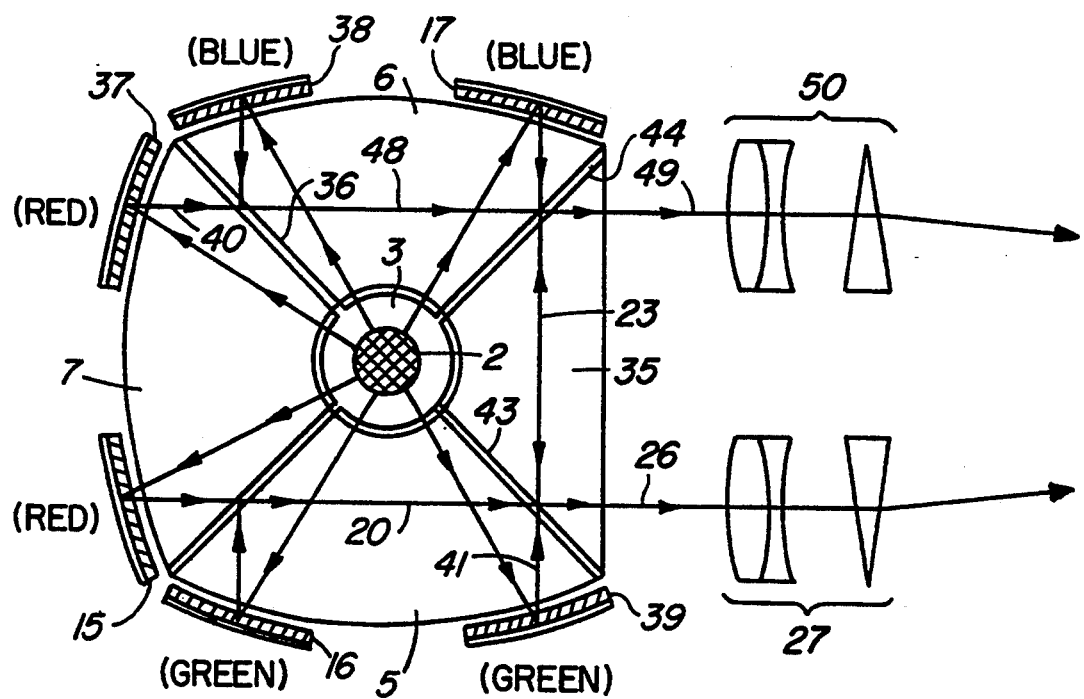

FIG. 5 illustrates in cross-section another embodiment of the invention of the form which can create a 3D image, an image formed from two sets of television pictures. It is preferred that the embodiment should use the basic curved external surfaces form of the various blocks described with reference to FIG. 4, and like parts are labelled with light reference numerals.

In this embodiment, block 7 should interface block 6 directly. Block 6 should not interface block 5 directly, but an intervening block 35 should interface blocks 5 and 6 as shown. Each of the blocks 5, 6, 7 and 35 should be shaped with 45° interior angles with respect to a straight line joining the external points of their interfaces, and the exterior walls of blocks 5, 6 and 7 are shaped as part of the exterior of cylinders, so that the angle of the light reflected from the conforming display units are directed directly into the lens systems to be described below.

Figure 6:
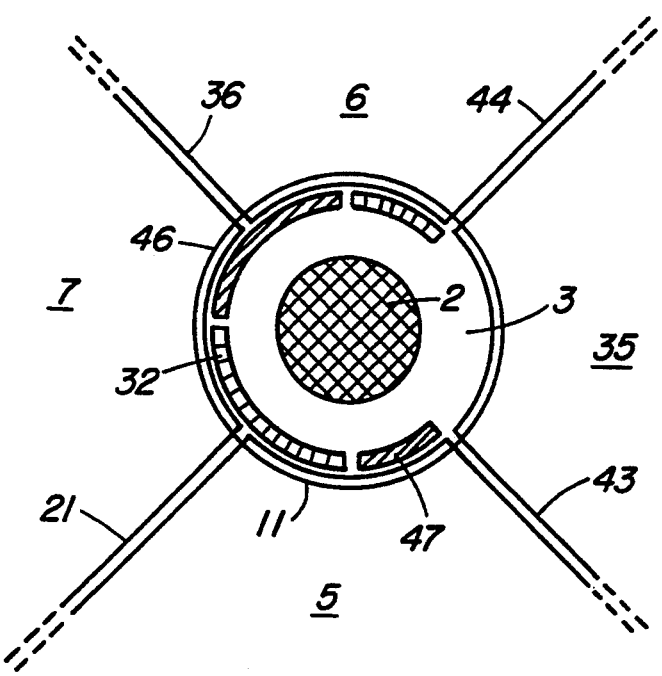
Figure 6A:
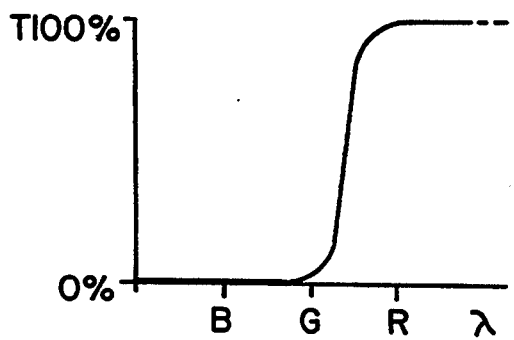

Instead of an absorber between blocks 6 and 7, a filter 36 is sandwiched between blocks 6 and 7. Filter 36 is a red pass, blue reflect filter having the transmission characteristics as shown in FIG. 6A. The red beam will thus pass through and the blue beam will be blocked.

The locations of one set of display units 15, 16 and 17 are similar to those shown in FIG. 4. A ray analysis of the corresponding red, green and blue beams of FIG. 5 will show that they are identical to those of FIG. 4. For the 3D system, however, there is a second set of image producing elements based on polarization rotation such as liquid crystal video display units for creating a second image. A display unit 37 for creating a second red picture image is disposed with a conforming front surface against the outside surface of block 7 adjacent the interface between blocks 6 and 7.

The light from lamp 2 thus reflects from display unit 37 to form a red beam along path 40. A second display unit 38 for creating a second blue picture image is disposed with its front conforming surface against the outside surface of block 6 with one edge adjacent the interface of blocks 6 and 7. It may be seen that the light from lamp 2 is reflected from display unit 38 and is reflected from reflector 36 so as to follow the exact beam path 40 as the red image.

A third display unit 39 for creating a green image is disposed with its front face interfacing the external face of block 5 with one edge adjacent the interface of blocks 5 and 35. Therefore light from lamp 2 will reflect against the display unit 39 where the green image of the second picture is created, and the resulting green image passes along beam path 41.

Figure 6B:
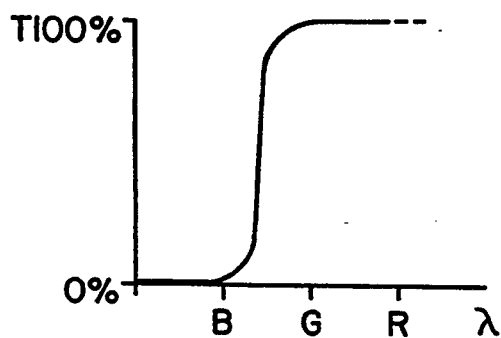

Sandwiched between the faces of blocks 5 and 35 is a filter, having red pass, green pass, blue reflect and long wavelength reflect characteristics, as shown in FIG. 6B which shows the transmission characteristics of filter 43.

Figure 6C:
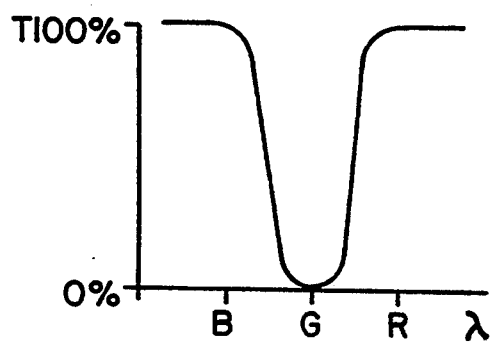

Sandwiched between the faces of blocks 6 and 35 at their interface is a filter 34 which has the transmission characteristics shown in FIG. 6C, red pass, blue pass and green reflect.

Figure 6D:
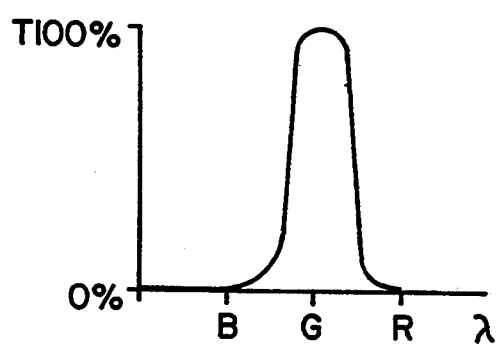
Figure 6E:
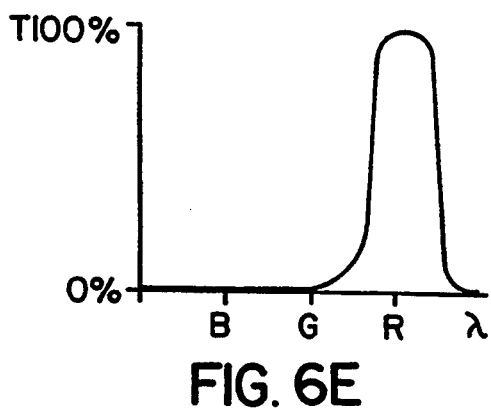
Figure 6F:
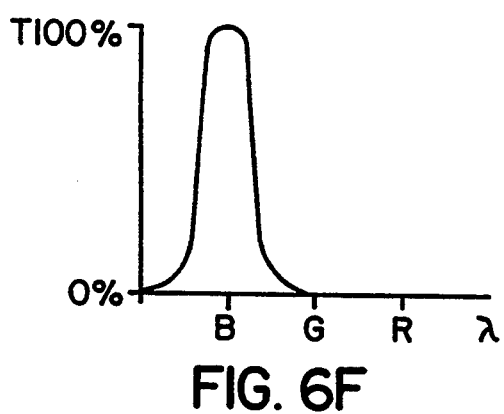

Instead of a partial filter lining the cylindrical region 3 adjacent block 5, the entire surface adjacent the cylindrical region 3 of block 5 is covered with a green bandpass filter, having the characteristics of FIG. 6D. Similarly the entire interface region between block 7 and the cylindrical region is lined by a red bandpass filter having the characteristics of FIG. 6E, and the entire interface region of block 6 and the cylindrical region is lined by a blue bandpass filter having the characteristics of FIG. 6F. The interface between blocks 6 and 5 contains the same filter 21 as was described earlier with respect to the embodiments of FIG. 1 and 4.

It is preferred that the second set of display units 37, 38 and 39 should create a light image which is polarized opposite to that of the first set of display units 15, 16 and 17, in order that the viewer can observe the separate pictures through separate eye filters polarized in opposite directions. The polarizers 32 and 33 are used as described earlier, and for example, pass vertically polarized light. A second, horizontally polarizing filter 46 lines the bandpass filters within the cylindrical region between filters 32 and 33, and another horizontal polarizing filter 47 similarly interfaces the green bandpass filter 11 between vertically polarizing filter 32 and the interface between blocks 5 and 35.

The result is that light from lamp 2 is transmitted to display unit 16 green and vertically polarized, to display unit 15 red and vertically polarized, and to display unit 17 blue and vertically polarized, and to display unit 38 blue and horizontally polarized to display unit 37 red and horizontally polarized, and to display unit 39 green and horizontally polarized.

As described earlier, the vertically polarized three colour vertically polarized picture element beams are combined from beams 20 and 23 to beam 26, exiting to the projection lens system 27. Similarly the three colour horizontally polarized beams are reflected from the second set of display units 37, 38 and 39, the red and blue beams passing along the same path as beam 23, but in the opposite direction, and being reflected from filter 44 in order to create combined beam 49 which enters a second projection lens 50. As noted above the combined beam 49 is formed of horizontally polarized light while the combined beam 26 is formed of vertically light polarized light, allowing a viewer to use horizontally and vertically polarized eye glass lenses to distinguish between the two pictures and thus create a 3D illusion of a single picture.

It will noted that the three primary coloured picture beams each follow paths which have identical lengths. It will also be noted that the entire 3D light controlling element unit has no parts which can move one relative to the other. The advantages described earlier are thus achieved in this 3D projection light controller.

In case the lamp burns out, it may be easily removed from the top of the cylindrical section and replaced. In case the light controlling element requires replacement, it need merely be removed and replaced as an unitary element. There are no internal lenses to adjust, and therefore servicing constitutes a simple task. Because the entire system is solid and preferably formed of sections of fused quartz, aging of the element is negligible.

As noted above, the exterior of the element may be coated with an anti-reflection coating, in order to keep transmission losses to a minimum. The result is a high efficiency projection TV light controlling element.

A person understanding this invention may now conceive of alternative structures and embodiments or variations of the above. All of those which fall within the scope of the claims appended hereto are considered to be part of the present invention.

I claim:

1. A projection TV light controller comprising a plurality of blocks of material which are transparent to the light of a lamp, adjacent sides of the blocks being cooperatively shaped and being disposed adjacent each other to form a single light controlling element, the element being shaped to surround the lamp which lies within the central axis of the element, means for conducting light from the lamp in each of three primary colours into respective ones of the blocks, means associated with each respective block for creating video display light signals relating to a corresponding primary colour, means for combining said video display light signals of all of the primary colours into a single light beam and for conducting said light beam out of said light controlling element.

2. A light controller as defined in claim 1 in which said means for conducting light from the lamp is comprised of plural bandpass filters each one for passing a primary colour into a block, and located along a circular periphery around the central axis and adjacent a corresponding block.

3. A light controller as defined in claim 2, in which each of said blocks is hollow and is evacuated.

4. A light controller as defined in claim 2 in which each of said blocks is solid.

5. A light controller as defined in claim 4 in which each of said blocks is formed of transparent material having a low coefficient of thermal expansion.

6. A light controller as defined in claim 4 in which each of said blocks is formed of fused quartz.

7. A light controller as defined in claim 2 further including reflectors located along said circular periphery at locations other than in the positions of said filters, for reflecting light back to ward the lamp.

8. A light controller as defined in claim 2, in which the means for creating video display light signals is comprised of three separate image producing elements based on polarization rotation, one for each colour, disposed against an external wall of a block and facing into the block.

9. A light controller as defined in claim 2, in which the means for creating video display light signals is comprised of three separate liquid crystal display elements, one for each colour, disposed against an external wall of a block and facing into a block.

10. A light controller as defined in claim 8 further including polarizer means interposed between the lamp position and each filter.

11. A light controller as defined in claim 8 further including polarizer means interposed between each filter and each image producing element.

12. A light controller as defined in claim 8 in which the shapes of the blocks are such that the outer perimeter of the light controlling element in horizontal cross-section, with the axis of the cylindrical region vertical, is a square, a first one of the blocks forming in said cross-section an equilateral triangle apart from said cylindrical section, a second one of said blocks having at least a right angle and a 45° angle apart from said cylindrical section, sides of each of the second and third blocks adjacent its 45° angle apart from said cylindrical section, sides of each of the second and third blocks adjacent its 45° angle being located adjacent the sides of the first blocks, and means for blocking light from passing between the adjacent sides of the second and third blocks.

13. A light controller as defined in claim 12 in which a pair of said image producing elements are disposed adjacent each other at right angles and against the sides of the first and third blocks, and filter means for blocking light of all colours except that colour in the third block from passing between the third and first block, and in which a third liquid crystal display element is disposed against a side of the second block to the immediate side of a corner of the light controlling element which is diagonal to said pair of liquid crystal display elements and at the side of said diagonal adjacent the third block, and a filter disposed between the first and second blocks for passing the colours of light from the first and third blocks out of the first block and for reflecting light from the second block, and means for conducting light from all three blocks toward a lens position.

14. A light controller as defined in claim 8, including at least three said blocks, the outer face of a first block and an adjacent outer face of the third block being curved, the outer face of a second block adjacent a diagonal from the interface between the first and third blocks and at the side of the diagonal adjacent the third block being curved, said image producing elements of one set curved cooperatively with the curved outer faces of said blocks being disposed thereagainst, filter means for blocking light of all colours except that colour in the third block from passing between the third and first block, and a filter disposed between the first and second blocks for passing the colours of light from the first and third blocks out of the first block and for reflecting light from the second block, and means for conducting light from all three blocks toward a line position.

15. A light controller as defined in claim 14, in which said second and third block interface at a position 90° from the interface of the first and third block, a filter disposed at the interface between the second and third blocks similar to the filter between the first and third blocks, a fourth block disposed between the first and second blocks having interfaces mutually 90° apart, filters for allowing the one colour of light of the adjacent block to pass through and for reflecting light of the other colours disposed between interfaces of adjacent fourth, first and second blocks, a pair of said image producing elements of a second set disposed against the outside faces of the third and second blocks adjacent their interface, and a third said image producing element of the second set disposed against the outside face of the first block adjacent the interface of the first and fourth block, and means for conducting separate parallel beams of light each containing all colours separately from the fourth block, each beam being controlled by one of said sets of image producing elements.

16. A light controller as defined in claim 15, in which the outer perimeter of said light controlling element is square.

17. A light controller as defined in claim 15, in which the outer sides of the first, second and third blocks all have similar shape, are equidistant from said central axis, and are curved so that the light is reflected toward said line position, the outer side of said fourth block being flat and perpendicular to a line passing through said axis and equidistant from the first and second blocks, said beams being perpendicular to said outer side of said fourth block.

18. A light controller as defined in claim 15, in which each of said blocks is hollow and is evacuated.

19. A light controller as defined in claim 15 in which each of said blocks is solid.

20. A light controller as defined in claim 19 in which each of said blocks is formed of fused quartz.

* * * * *